United States Patent
Yamada

(10) Patent No.: US 10,428,866 B2
(45) Date of Patent: Oct. 1, 2019

(54) SLIDE BEARING AND STRUT-TYPE SUSPENSION

(71) Applicant: OILES CORPORATION, Tokyo (JP)

(72) Inventor: Tomohiro Yamada, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 187 days.

(21) Appl. No.: 15/532,342

(22) PCT Filed: Dec. 1, 2015

(86) PCT No.: PCT/JP2015/083823
§ 371 (c)(1),
(2) Date: Jun. 1, 2017

(87) PCT Pub. No.: WO2016/088782
PCT Pub. Date: Jun. 9, 2016

(65) Prior Publication Data
US 2018/0010630 A1     Jan. 11, 2018

(30) Foreign Application Priority Data

Dec. 3, 2014 (JP) .................................. 2014-245428

(51) Int. Cl.
*F16C 17/04* (2006.01)
*B60G 3/28* (2006.01)
(Continued)

(52) U.S. Cl.
CPC ................ *F16C 17/04* (2013.01); *B60G 3/28* (2013.01); *B60G 11/16* (2013.01); *B60G 15/06* (2013.01);
(Continued)

(58) Field of Classification Search
CPC ........ B60G 15/06; B60G 3/28; B60G 15/068; B60G 15/07; B60G 11/16;
(Continued)

(56) References Cited

U.S. PATENT DOCUMENTS

| 4,166,627 A | 9/1979 | Bainard et al. |
| 4,268,040 A | 5/1981 | Bainard et al. |

(Continued)

FOREIGN PATENT DOCUMENTS

| CN | 103906937 | 7/2014 |
| DE | 27 46 594 A1 | 4/1978 |

(Continued)

OTHER PUBLICATIONS

Search Report issued in CN Appln. No. 2015800619809 dated Sep. 10, 2018 (w/translation).

(Continued)

*Primary Examiner* — Toan C To
(74) *Attorney, Agent, or Firm* — Nixon & Vanderhye P.C.

(57) ABSTRACT

Provided are: a slide bearing configured so that degradation in sliding performance caused by the entry of dust, muddy water, etc. can be prevented at low cost; and a strut-type suspension using the slide bearing. A slide bearing (1) is provided with: an upper case (2); a lower case (3) joined to the upper case (2) in a pivotal manner and forming an annular space (5) between the upper case (2) and the lower case (3); and an annular center plate (4) disposed in the annular space (5). An annular lip (43) is formed integrally at the outer peripheral edge (423) of the flange (42) of the center plate (4). The lip (43) is in contact, while deflecting, with an annular protrusion (252) formed in an annular groove (24) in the upper case (2) and covers a thrust bearing surface (422) and a thrust supporting surface (251).

16 Claims, 9 Drawing Sheets

(51) Int. Cl.
*B60G 11/16* (2006.01)
*B60G 15/06* (2006.01)
*F16C 33/74* (2006.01)
*F16F 9/54* (2006.01)
*B60G 15/07* (2006.01)
*B60G 15/00* (2006.01)
*F16C 33/20* (2006.01)
*F16C 17/10* (2006.01)

(52) U.S. Cl.
CPC ............ *B60G 15/068* (2013.01); *B60G 15/07* (2013.01); *F16C 33/74* (2013.01); *F16F 9/54* (2013.01); *B60G 2204/418* (2013.01); *F16C 17/107* (2013.01); *F16C 33/20* (2013.01); *F16C 2326/05* (2013.01)

(58) Field of Classification Search
CPC .... B60G 2204/418; F16C 33/74; F16C 17/04; F16C 33/20; F16C 2326/05; F16C 17/107; F16F 9/54
USPC .... 280/124.145, 124.146, 124.147; 384/420, 384/422, 425
See application file for complete search history.

(56) References Cited

U.S. PATENT DOCUMENTS

| | | | | |
|---|---|---|---|---|
| 5,467,971 | A * | 11/1995 | Hurtubise | B60G 15/068 188/322.12 |
| 7,032,912 | B2 * | 4/2006 | Nicot | B60G 17/04 267/267 |
| 7,077,248 | B2 * | 7/2006 | Handke | B60G 15/068 188/321.11 |
| 8,226,301 | B2 * | 7/2012 | Poulle | B60G 11/15 280/124.145 |
| 8,302,980 | B2 * | 11/2012 | Scolaro | B60G 15/068 280/124.147 |
| 8,506,171 | B2 * | 8/2013 | Stautner | B60G 15/067 384/607 |
| 9,028,150 | B2 * | 5/2015 | Nagashima | B60G 15/068 384/420 |
| 2002/0109328 | A1 * | 8/2002 | Remmert | B60G 11/16 280/124.147 |
| 2011/0221158 | A1 * | 9/2011 | Stautner | B60G 15/068 280/124.147 |
| 2011/0311177 | A1 * | 12/2011 | Viault | B60G 15/068 384/607 |
| 2012/0257849 | A1 * | 10/2012 | Corbett | B60G 15/067 384/607 |
| 2013/0277161 | A1 | 10/2013 | Bussit et al. | |
| 2014/0112605 | A1 | 4/2014 | Morishige et al. | |
| 2014/0270609 | A1 | 9/2014 | Morishige et al. | |
| 2015/0226263 | A1 | 8/2015 | Morishige et al. | |
| 2015/0316099 | A1 | 11/2015 | Morishige et al. | |
| 2015/0367698 | A1 | 12/2015 | Stautner et al. | |
| 2018/0106292 | A1 * | 4/2018 | Sekine | F16C 17/10 |

FOREIGN PATENT DOCUMENTS

| | | |
|---|---|---|
| DE | 10 2010 025372 A1 | 12/2011 |
| DE | 10 2013 103 962 | 10/2013 |
| DE | 10 2013 201965 A1 | 8/2014 |
| JP | 61-022926 | 2/1986 |
| JP | 63-094319 | 6/1988 |
| JP | 2004-263771 | 9/2004 |
| JP | 2006-322556 | 11/2006 |
| JP | 4329726 | 9/2009 |
| JP | 4380177 | 12/2009 |
| JP | 2012-172814 | 9/2012 |
| JP | 2013-096534 | 5/2013 |
| JP | 2014-040869 A | 3/2014 |
| KR | 10-2011-0035223 A | 6/2011 |
| KR | 10-2014-0009547 A | 1/2014 |

OTHER PUBLICATIONS

International Search Report for PCT/JP2015/083823, dated Jan. 26, 2016, 5 pages.
Supplementary European Search Report issued in European Application No. 15 86 6233, dated Jul. 4, 2018, 2 pages.
Machine Translation for JP 63-94319 (5 pages).

* cited by examiner

Fig.5
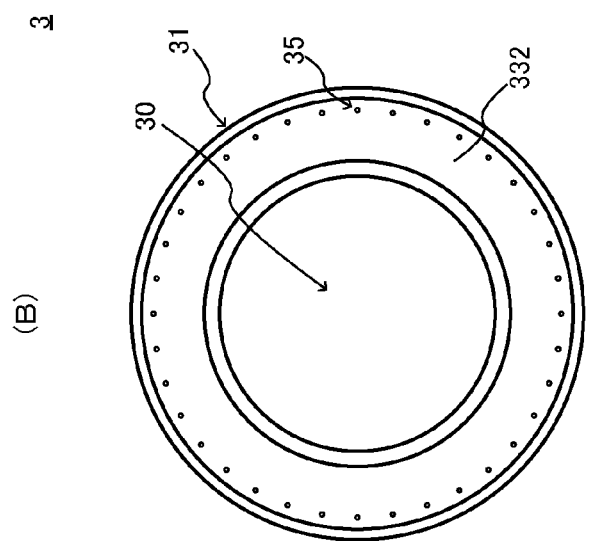
(A)
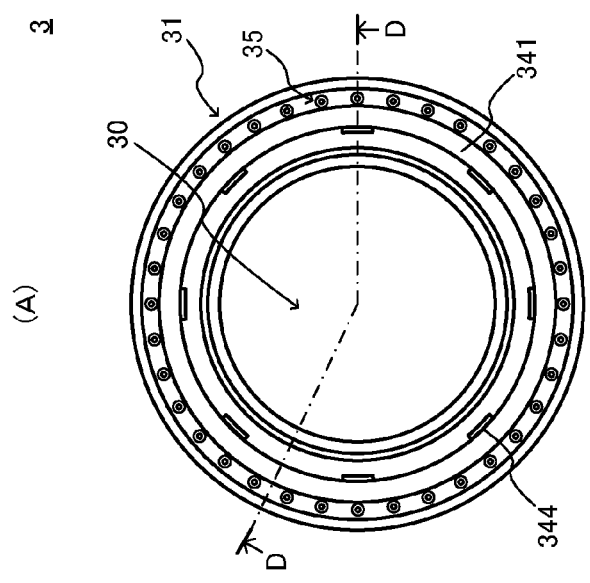
(C)
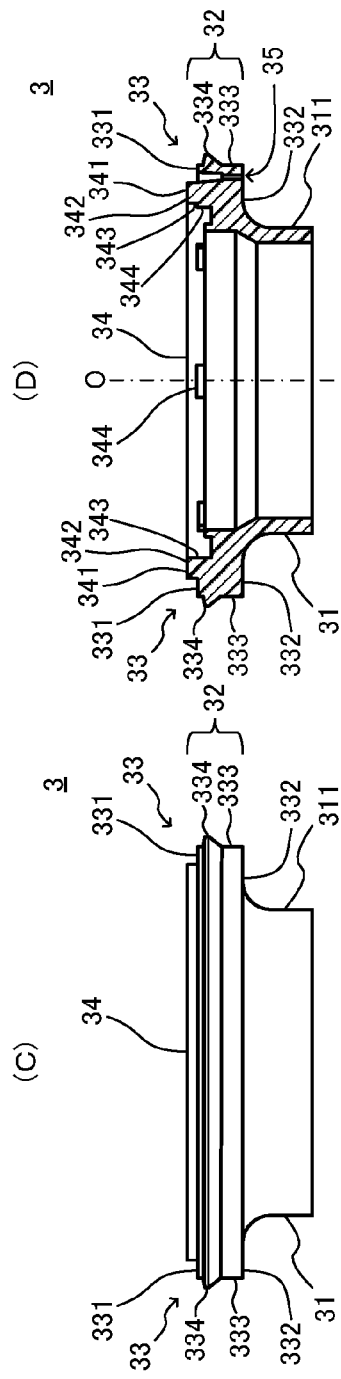
(B)
(D)

SLIDE BEARING AND STRUT-TYPE SUSPENSION

This application is the U.S. national phase of International Application No. PCT/JP2015/083823 filed 1 Dec. 2015, which designated the U.S. and claims priority to JP Patent Application No. 2014-245428 filed 3 Dec. 2014, the entire contents of each of which are hereby incorporated by reference.

TECHNICAL FIELD

The present invention relates to a slide bearing that supports a load applied to a shaft member while allowing rotation of the shaft member, and in particular, relates to a slide bearing that supports a load applied to a strut-type suspension (McPherson strut) while allowing rotation of a strut assembly of the strut-type suspension.

BACKGROUND ART

A strut-type suspension used for a front wheel of an automobile has structure in which a strut assembly comprising a piston rod and a hydraulic shock absorber is combined with a coil spring. When a steering is operated, the strut-type assembly is rotated together with the coil spring. Accordingly, to allow smooth rotation of the strut assembly, usually a bearing is placed between an upper mount which is a mounting mechanism for mounting the strut assembly onto the automobile body, and an upper spring seat as a spring seat for the upper end of the coil spring.

For example, the Patent Literature 1 discloses a slide bearing made of synthetic resin as a bearing for a strut-type suspension. This slide bearing comprises: an upper case made of synthetic resin which is fitted on the side of an upper mount; a lower case made of synthetic resin which is fitted on the side of an upper spring seat and combined rotatably with the upper case; and a center plate which is placed in an annular space formed by combining the upper case with the lower case and functions as a bearing body for realizing smooth rotation between the upper case and the lower case. Here, in a bearing surface of the center plate, a plurality of grooves functioning as lubricating grease reservoirs are formed, and are filled with lubricating grease. On the outer periphery side of the annular space, an outer elastic seal member is placed to close up a gap between the upper case and the lower case. Similarly, on the inner periphery side of the annular space, an inner elastic seal member is placed to close up a gap between the upper case and the lower case.

According to the synthetic-resin slide bearing described in the Patent Literature 1, since the annular space formed by combining the upper case with the lower case is sealed by the outer elastic seal and the inner elastic seal, it is possible to prevent intrusion of dust, muddy water or the like even under extreme conditions. Thus, it is possible to prevent effectively degradation of the sliding performance due to intrusion of dust, muddy water or the like between the bearing surface of the center plate placed in the annular space and a support-target surface of the upper case or the lower case facing the bearing surface.

CITATION LIST

Patent Literature

Patent Literature 1: Japanese Unexamined Patent Application Laid-Open No. 2012-172814

SUMMARY OF INVENTION

Technical Problem

However, the synthetic-resin slide bearing described in the Patent Literature 1 requires addition of the seal members for sealing the annular space formed by combining the upper case with the lower case to prevent intrusion of dust, muddy water or the like into the annular space, so that the number of parts of the slide bearing is increased and costs are increased.

The present invention has been made considering the above situation, and an object of the invention is to provide a slide bearing that can prevent degradation of sliding performance due to intrusion of dust, muddy water or the like at low cost, and is to provide a strut-type suspension using the slide bearing.

Solution to Problem

To solve the above problem, the present invention provides a slide bearing comprising a lip which is integrally formed with at least one of outer and inner peripheral edges of a center plate. The lip comes in contact, while being bent, with an upper case or a lower case in which a support-target surface that slides on a bearing surface of the center plate is formed, so as to cover a sliding area between the bearing surface and the support-target surface from an outer or inner periphery side. Thereby, the lip prevents intrusion of dust, muddy water or the like into the sliding area via a gap between the upper case and the lower case which are combined with each other.

For example, the present invention provides a slide bearing for supporting a load of a support target, comprising:

an upper case which is subjected to the load of the support target;

a lower case which is rotatably combined with the upper case and forms an annular space in combination with the upper case; and a center plate which is placed in the annular space and functions as a bearing body realizing rotation between the upper case and the lower case, wherein:

the center plate has a lip which is integrally formed with at least one of outer and inner peripheral edges of the center plate; and the lip comes in contact with the upper case or the lower case, in which a support-target surface that slides against a bearing surface formed in the center plate is formed, so as to cover a sliding area between the bearing surface and the support-target surface from an outer or inner periphery side.

Here, it is possible that:

the slide bearing supports the load of the support target which is applied to a shaft member, while allowing rotation of the shaft member;

the upper case is fitted to a mounting mechanism for mounting the shaft member to the support target, in a state that the shaft member is inserted in the upper case;

the lower case is fitted to a spring seat for an upper end of a coil spring combined with the shaft member, in a state that the shaft member is inserted in the lower case; and the center plate is placed in the annular space, in a state that the shaft member is inserted in the center plate.

In that case, a strut-type suspension using the slide bearing comprises:

a strut assembly whose external cylinder contains a hydraulic shock absorber integrated with a piston rod; and a coil spring into which the piston rod is inserted and which is rotated together with the strut assembly by steering operation, wherein:

the upper case of the slide bearing is fitted to an upper mount which is the mounting mechanism for mounting the strut assembly to a vehicle body, in a state that the piston rod is inserted in the upper case; and the lower case of the slide bearing is fitted to an upper spring seat which is the spring seat for the upper end of the coil spring.

Advantageous Effects of Invention

According to the present invention, the lip which is integrally formed with at least one of the outer and inner peripheral edges of the center plate. The lip comes in contact, while being bent, with the upper case or the lowercase in which the support-target surface that slides on the bearing surface of the center plate is formed, so as to cover the area of sliding between the bearing surface and the support-target surface from the outer periphery side or the inner periphery side. Thereby, it is possible to prevent intrusion of dust, muddy water or the like via the gap between the upper case and the lower case combined with each other. Thus it is possible to prevent degradation of the sliding performance due to intrusion of dust, muddy water or the like, without increasing the number of parts of the slide bearing.

BRIEF DESCRIPTION OF DRAWINGS

FIGS. 5(A), 5(B), and 5(C) are respectively a front view, a back view, and a side view of the lower case 3, and FIG. 5(D) is a D-D cross-section view of the lower case 3 shown in FIG. 5(A);

DESCRIPTION OF EMBODIMENT

In the following, one embodiment of the present invention will be described.

Figure 1:
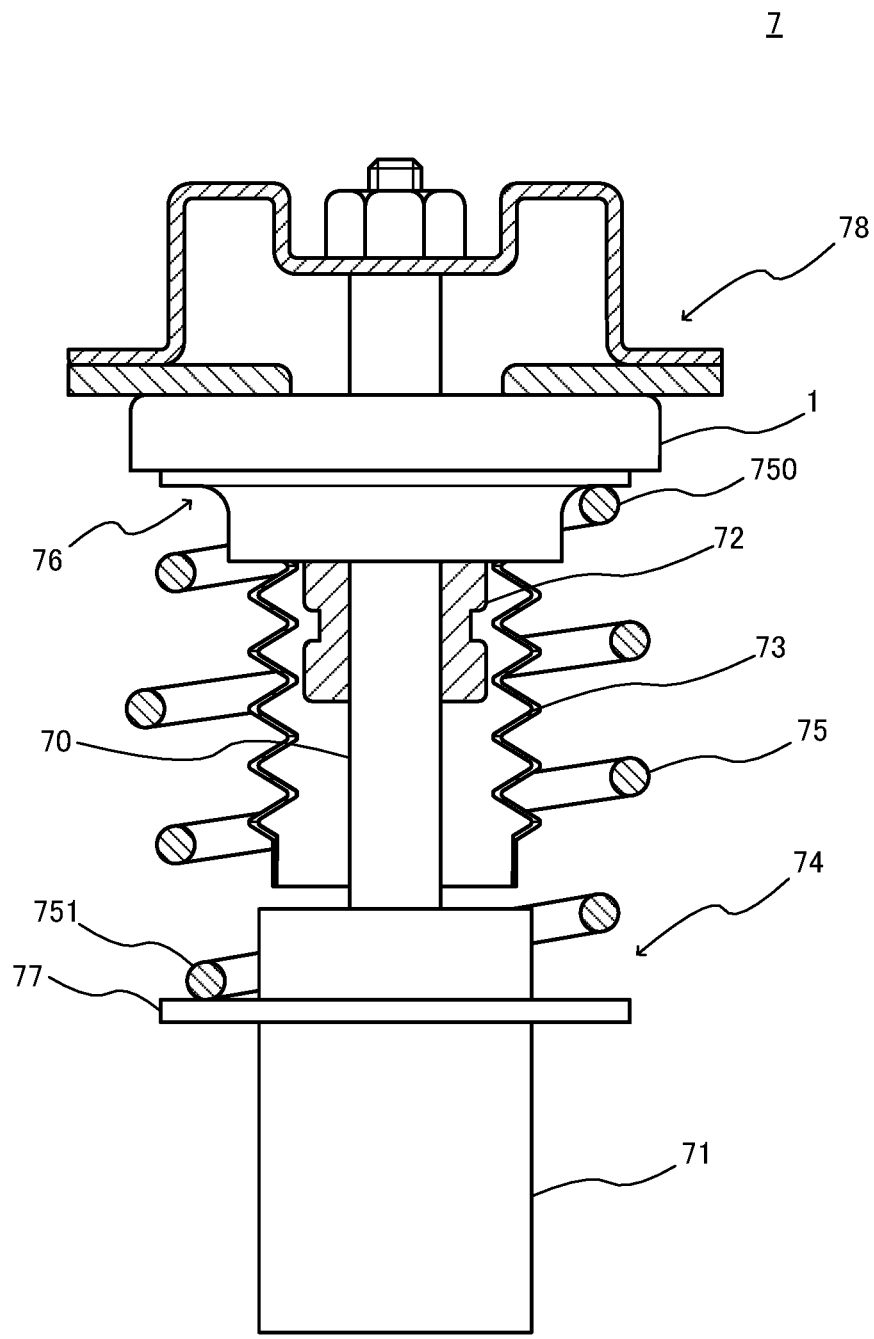
FIG. 1 is a schematic partial cross-section showing a strut-type suspension 7 using a slide bearing 1 according to one embodiment of the present invention.

FIG. 1 is a schematic partial cross-section showing a strut-type suspension using a slide bearing 1 according to the present embodiment.

The strut-type suspension 7 is used as a suspension of a vehicle such as an automobile, and, as shown in the figure, comprises: a strut assembly 74 which includes a piston rod 70, a hydraulic shock absorber 71, a bump stopper 72, and a dust boot 73; a coil spring 75 which rotates together with the strut assembly 74 by steering operation; and the slide bearing 1 for mounting the strut assembly 74 rotatably to a vehicle body.

The bump stopper 72 is mounted on the piston rod 70, and prevents collision of the strut assembly 74 against the vehicle body (not shown) when the piston rod 70 is compressed. The dust boot 73 is set for covering the piston rod 70 on which the bump stopper 72 is mounted, and prevents adherence of dust, muddy water or the like to the piston rod 70. The piston rod 70 to which the bump stopper 72 and the dust boot 73 are mounted is inserted into the coil spring 75. The upper end 750 of the coil spring 75 is supported by an upper spring seat 76 provided in the slide bearing 1, and the lower end 751 of the coil spring 75 is supported by a lower spring seat 77 provided in the shock absorber 71.

The slide bearing 1 is placed between the upper end 750 of the coil spring 75 and an upper mount 78 that is a mounting mechanism for mounting the strut assembly 74 onto the vehicle body.

Figure 2:
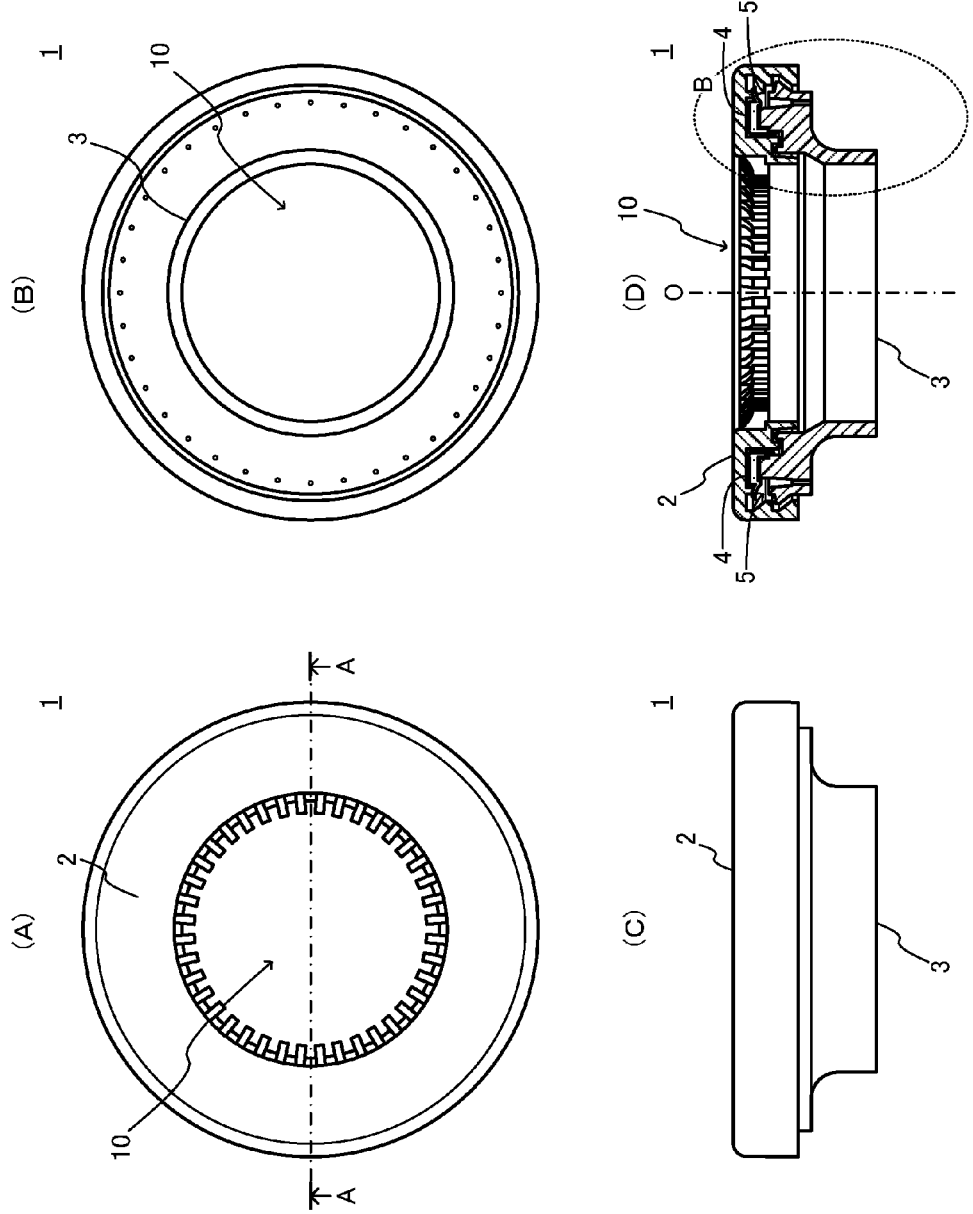
FIGS. 2(A), 2(B), and 2(C) are respectively a front view, a back view, and a side view of the slide bearing 1.
FIG. 2(D) is an A-A cross-section view of the slide bearing 1 shown in FIG. 2(A)
Figure 3:
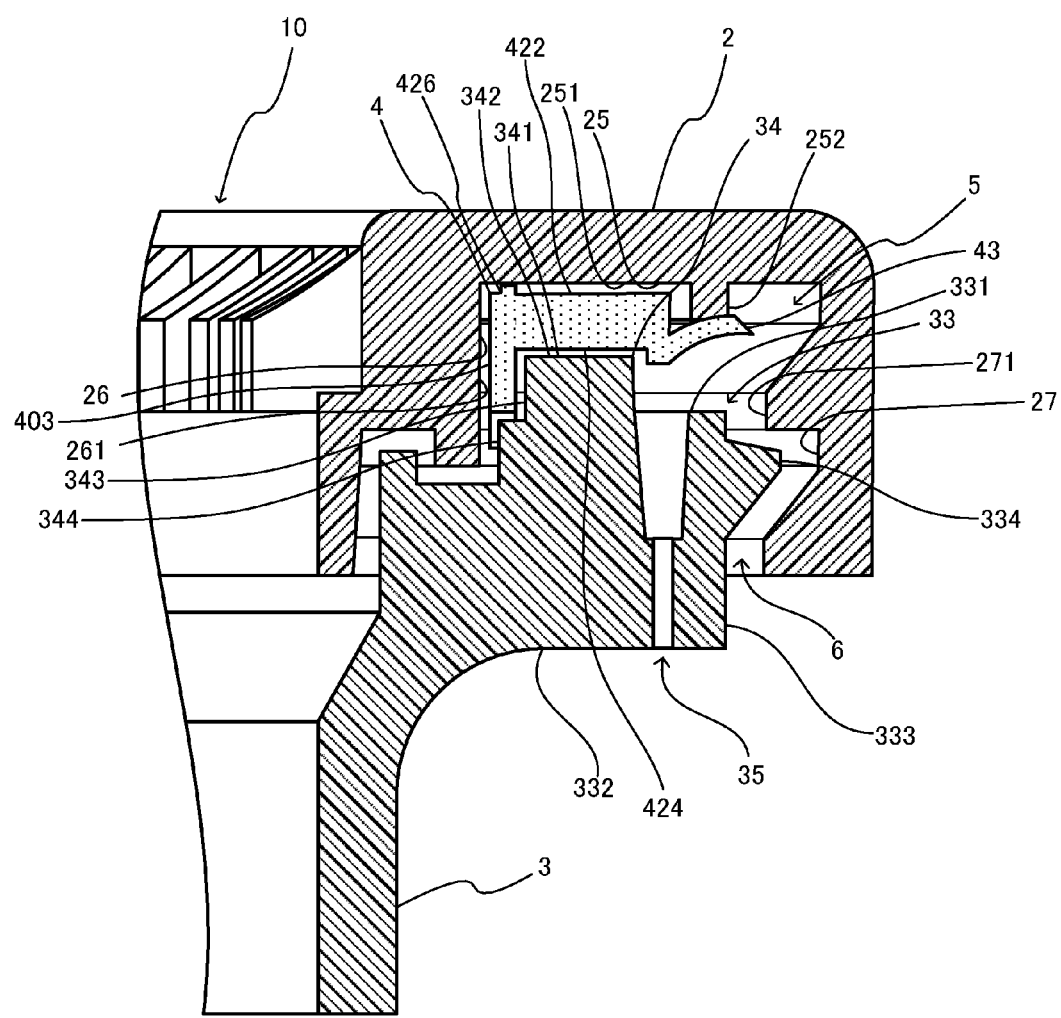
FIG. 3(A) is an enlarged view of the part B of the slide bearing 1 shown in FIG. 2(D)

FIGS. 2(A), 2(B), and 2(C) are respectively a front view, a back view, and a side view of the slide bearing 1 of the present embodiment, and FIG. 2(D) is an A-A cross-section view of the slide bearing 1 shown in FIG. 2(A). Further, FIG. 3(A) is an enlarged view of the part B of the slide bearing 1 shown in FIG. 2(D).

As shown in the figures, the slide bearing 1 has a receiving hole 10 for receiving the strut assembly 74 of the strut-type suspension 7, and supports a load applied to the strut-type suspension 7 while allowing rotation of the strut assembly 74 received in the receiving hole 10. Further, the slide bearing 1 comprises: an upper case 2; a lower case 3 which is rotatably combined with the upper case 2 so that an annular space 5 is formed between the upper case 2 and the lower case 3; and an annular center plate 4 placed in the annular space 5.

The upper case 2 is formed of thermoplastic resin excellent in sliding characteristics such as polyacetal resin impregnated if necessary with lubricating oil, and is fitted to the upper mount 78 in a state that the strut assembly 74 of the strut-type suspension 7 is inserted in the upper case 2.

Figure 4:
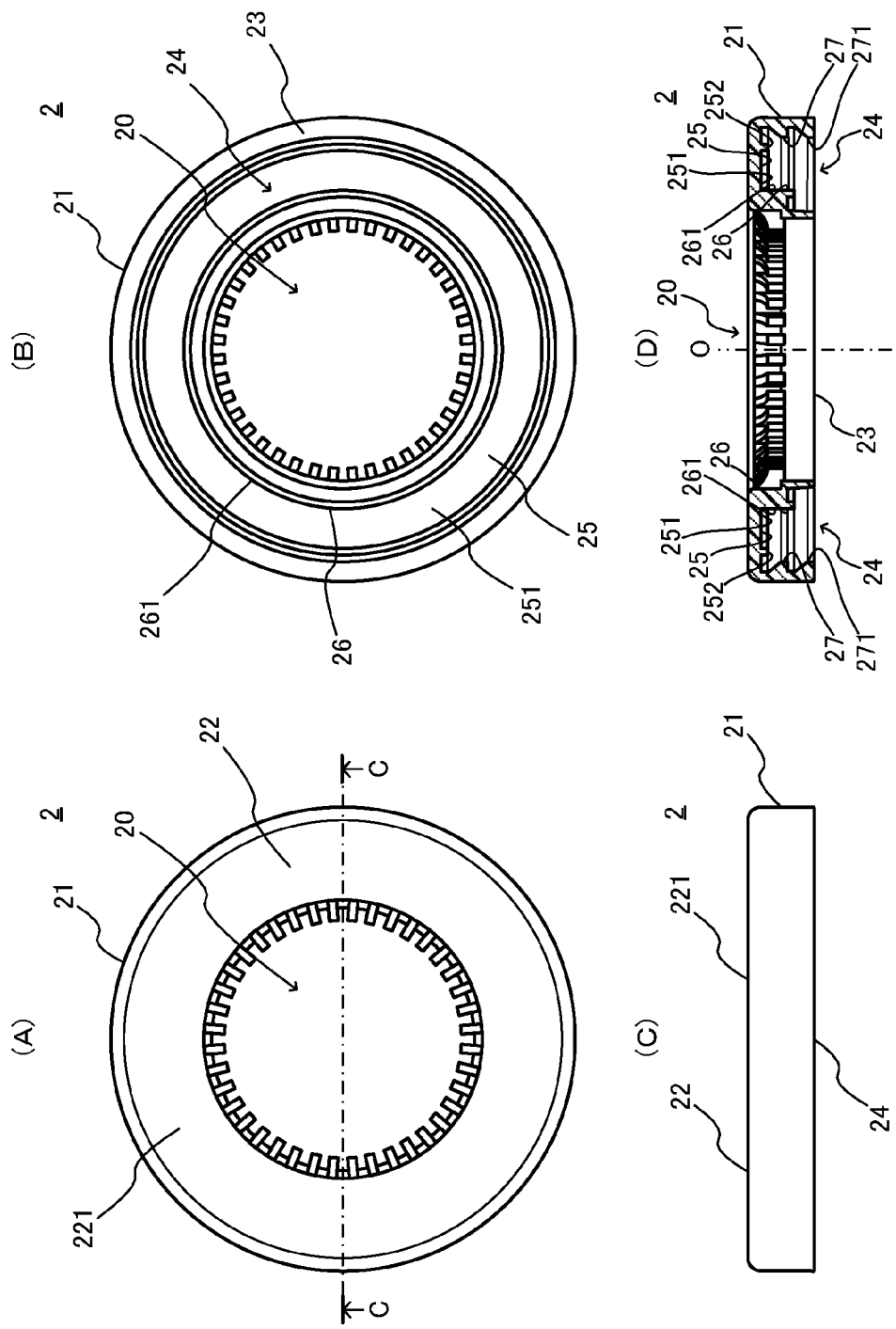
FIGS. 4(A), 4(B), and 4(C) are respectively a front view, a back view, and a side view of the upper case 2.
FIG. 4(D) is a C-C cross-section view of the upper case 2 shown in FIG. 4(A)

FIGS. 4(A), 4(B), and 4(C) are respectively a front view, a back view, and a side view of the upper case 2, and FIG. 4(D) is a C-C cross-section view of the upper case 2 shown in FIG. 4(A).

As shown in the figures, the upper case 2 comprises: an annular upper case body 21 having an insertion hole 20 for inserting the strut assembly 74; a fitting surface 221 which is formed in the upper surface 22 of the upper case body 21, and is fitted to the upper mount 78; an annular groove 24 which is formed in the lower surface 23 of the upper case body 21, and is opened on the side of the lower surface 23 and is closed on the side of the upper surface 22, so that the annular space 5 is formed when the upper case 2 is rotatably combined with the lower case 3; an annular thrust support-target surface 251 which is formed in the groove bottom 25 of the annular groove 24 and slides with respect to a below-mentioned thrust bearing surface 422 of the center plate 4; and a cylindrical radial support-target surface 261 which is formed in the inner-periphery sidewall 26 of the annular groove 24 and slides with respect to a below-mentioned radial bearing surface 403 of the center plate 4.

In the groove bottom 25 of the annular groove 24, an annular protrusion 252 which protrudes from the groove bottom 25 toward the lower surface 23 is formed on the side of the outer peripheral edge of the thrust support-target surface 251. The annular protrusion 252 encloses the center plate 4 placed in the annular groove 24 and abuts against a below-mentioned annular lip 43 of the center plate 4.

In the outer-periphery sidewall 27 of the annular groove 24, a concave-convex portion 271 is formed. When the upper case 2 is rotatably combined with the lower case 3, the concave-convex portion 271 makes a labyrinth 6 connected to the annular space 5, in combination with the lower case 3. Since a gap which connects to the annular space 5 and is between the upper case 2 and the lower case 3 makes the labyrinth 6, it is possible to lower the possibility that dust, muddy water or the like intrudes into the annular space 5 through this gap.

The lower case 3 is formed of thermoplastic resin such as polyamide resin, and supports the upper end 750 of the coil spring 75 of the strut-type suspension 7, in a state that the strut assembly 74 of the strut-type suspension 7 is inserted in the lower case 3.

FIGS. 5(A), 5(B), and 5(C) are respectively a front view, a back view, and a side view of the lower case 3, and FIG. 5(D) is a D-D cross-section view of the lower case 3 shown in FIG. 5(A).

As shown in the figures, the lower case 3 comprises: a cylindrical lower case body 31 having an insertion hole 30 for inserting the strut assembly 74; a flange 33 which is formed on the side of the upper end 32 of the lower case body 31 and protrudes outward in the radial direction from the outer peripheral surface 311 of the lower case body 31; an annular protrusion 34 which is formed on the upper surface 331 of the flange 33, protrudes toward the upper case 2, and makes the annular space 5 by being inserted in the annular groove 24 formed in the lower surface 23 of the upper case body 21 of the upper case 2 when the lower case 3 is rotatably combined with the upper case 2; and a plurality of discharge holes 35 which are positioned at regular intervals on the outer periphery side of the annular protrusion 34 and run through the upper surface 331 and the lower surface 332 of the flange 33. In FIG. 5, only some of the discharge holes 35 are given the reference number, for the sake of simplicity of the figure.

In the outer peripheral surface 333 of the flange 33, a concave-convex portion 334 is formed. When the lower case 3 is rotatably combined with the upper case 2, the concave-convex portion 334 makes the labyrinth 6 connected to the annular space 5 in combination with the upper case 2.

The discharge holes 35 are for discharging dust, muddy water or the like which has intruded into the annular space 5 through the labyrinth 6, to the outside from the lower surface 332 of the flange 33. To prevent intrusion of dust, muddy water or the like from the side of the lower surface 332 of the flange 33, the hole diameter of each discharge hole 35 on the side of the lower surface 332 of the flange 33 is smaller than the hole diameter of the hole 35 on the side of the upper surface 331 of the flange 33. The hole shape of each discharge hole 35 may be not circular but polygonal for example.

In the upper surface 341 of the annular protrusion 34, a mounting surface 342 is formed for mounting the center plate 4. Further, on the inner-periphery sidewall 343 of the protrusion 34, rotation locks 344 are formed for preventing rotation of the center plate 4 when the center plate 4 is mounted on the mounting surface 342. In FIG. 5, only some of the rotation locks 344 are given the reference number, for the sake of simplicity of the figure.

The lower surface 332 of the flange 33 functions as the upper spring seat 76 for supporting the upper end 750 of the coil spring 75 of the strut-type suspension 7.

The center plate 4 is formed of thermoplastic resin excellent in sliding characteristics such as polyolefin resin impregnated if necessary with lubricating oil. The center plate 4 is fixed on the mounting surface 342 of the annular protrusion 34 formed in the upper surface 331 of the flange 33 of the lower case 3, and slides on the thrust support-target surface 251 formed in the groove bottom 25 of the annular groove 24 of the upper case 2, and slides on the radial support-target surface 261 formed in the inner-periphery sidewall 26 of the annular groove 24 of the upper case 2. Thereby, the center plate 4 functions as a bearing body that realizes free rotation between the upper case 2 and the lower case 3.

FIGS. 6(A), 6(B), and 6(C) are respectively a front view, a back view, and a side view of the center plate 4, FIG. 6(D) is an E-E cross-section view of the center plater 4 shown in FIG. 6(A), and FIG. 6(E) is an enlarged view of the part F of the center plate 4 shown in FIG. 6(D).

Figure 6:
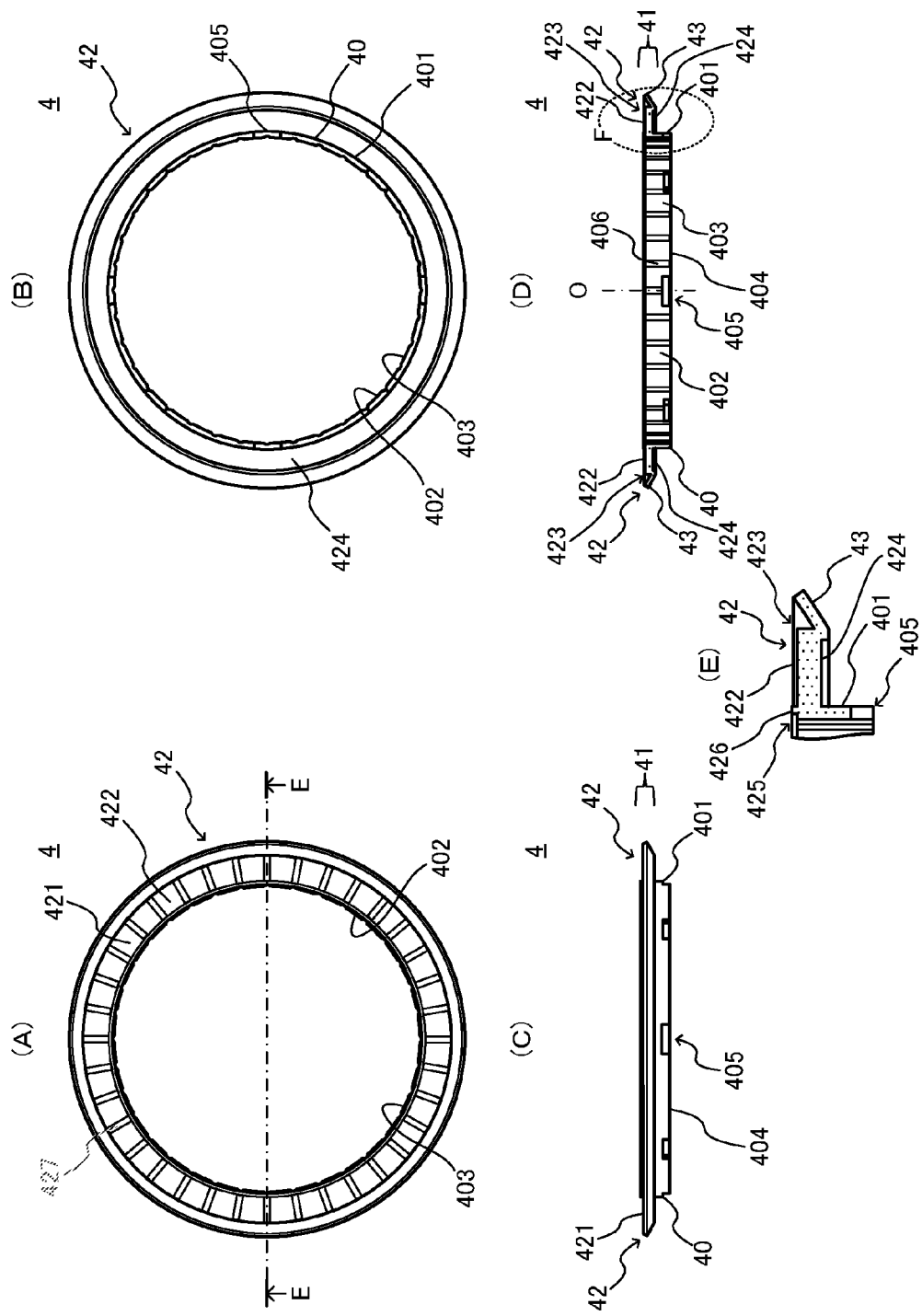
FIGS. 6(A), 6(B), and 6(C) are respectively a front view, a back view, and a side view of the center plate 4.
FIG. 6(D) is an E-E cross-section view of the center plate 4 shown in FIG. 6(A)
FIG. 6(E) is an enlarged view of the part F of the center plate 4 shown in FIG. 6(D)

As shown in the figures, the center plate 4 comprises: a cylindrical rib 40; a flange 42 which is formed on the side of the upper end 41 of the rib 40 and extends radially outward from the outer peripheral surface 401 of the rib 40; a thrust bearing surface 422 which is formed in the upper surface 421 of the flange 42; a radial bearing surface 403 which is formed in the inner peripheral surface 402 of the rib 40; an annular lip 43 which is formed integrally with the outer peripheral edge 423 of the flange 42; and a plurality of concave rotation locks 405 which are formed on the side of the lower end surface 404 of the rib 40. In FIG. 6, only some of the rotation locks 405 are given the reference number, for the sake of simplicity of the figure.

When the center plate 4 is mounted on the lower case 3 so that the lower surface 424 of the flange 42 comes in contact with the mounting surface 342 of the annular protrusion 34 formed in the lower case 3, the cylindrical rib 40 is inserted into the inside of the annular protrusion 34.

Also when the center plate 4 is mounted on the lower case 3 so that the lower surface 424 of the flange 42 comes in contact with the mounting surface 342 of the annular protrusion 34 formed in the lower case 3, the rotation locks 405 are fitted onto the rotation locks 344 formed on the inner-periphery sidewall 343 of the protrusion 34, and prevent rotation of the center plate 4 relative to the lower case 3.

The thrust bearing surface 422 slides against the thrust support-target surface 251 of the upper case 2. In the thrust bearing surface 422, a plurality of radial grooves 427 functioning as lubricating grease reservoirs are formed radially. Lubricating grease held in the grooves 427 lubricates the sliding area between the thrust bearing surface 422 and the thrust support-target surface 251. In FIG. 6, only some of the grooves 427 are given the reference number, for the sake of simplicity of the figure. Further, in the inner peripheral edge 425 of the flange 42, an annular protrusion 426 is formed to protrude from the thrust bearing surface 422 toward the upper case 2 along a circumferential direction of the center plate 4. This annular protrusion 426 prevents pushing out of the lubricating grease held in the thrust bearing surface 422 toward the inner peripheral edge 425 of the flange 42, when the thrust bearing surface 422 and the thrust support-target surface 251 of the upper case 2 slide with respect to each other.

The radial bearing surface 403 slides against the radial support-target surface 261 of the upper case 2. In the radial bearing surface 403, a plurality of axial grooves 406 functioning as lubricating grease reservoirs are formed, being arranged in a circumferential direction. Lubricating grease held in the grooves 406 lubricates the sliding area between the radial bearing surface 403 and the radial support-target surface 261 of the upper case 2. In FIG. 6, only some of the grooves 406 are given the reference number, for the sake of simplicity of the figure.

The annular lip 43 is formed so as to be thinner than the flange 42, and extends radially outward from the outer peripheral edge 423 of the flange 42, being directed toward the side of the upper surface 421 of the flange 42 from the side of the lower surface 424 of the flange 42. When the lower case 3 is rotatably combined with the upper case 2 in a state that the center plate 4 is set in the lower case 3, the annular lip 43 comes in contact, while being bent, with the annular protrusion 252 formed in the annular groove 24 of the upper case 2, and covers the thrust bearing surface 422 and the thrust support-target surface 251 of the upper case 2. Thereby, dust, muddy water or the like that has intruded into the annular space 5 through the labyrinth 6 is prevented from intruding into the sliding area between the thrust bearing surface 422 and the thrust support-target surface 251.

In the slide bearing 1 of the present embodiment having the above-described structure, the center plate 4 is fixed on the mounting surface 342 of the annular protrusion 34 formed in the upper surface 331 of the flange 33 of the lower case 3. The center plate 4 slides against the thrust support-target surface 251 formed in the groove bottom 25 of the annular groove 24 of the upper case 2, and slides against the radial support-target surface 261 formed in the inner-periphery sidewall 26 of the annular groove 24 of the upper case 2. Accordingly, the upper case 2 is rotatably combined with the lower case 3 while supporting the loads in the thrust direction and in the radial direction via the center plate 4. Thereby, the slide bearing 1 supports the load of the strut-type suspension 7, while allowing rotation of the strut assembly 74 of the strut-type suspension 7, in a state that the strut assembly 74 is inserted in the receiving hole 10. Here, the load is applied via the coil spring 75 of the strut-type suspension 7, and the coil spring 75 is supported by the lower surface 332 of the flange 33 of the lower case 3, the lower surface 332 functioning as the upper spring seat 76.

Hereinabove, one embodiment of the present invention has been described.

In the slide bearing 1 of the present embodiment, the annular lip 43 integrally formed with the outer peripheral edge 423 of the flange 42 of the center plate 4 comes in contact, while being bent, with the annular protrusion 252 formed in the annular groove 24 of the upper case 2, and covers the thrust bearing 422 of the center plate 4 and the thrust support-target surface 251 of the upper case 2. Thereby, dust, muddy water or the like that has intruded into the annular space 5 through the labyrinth 6 (i.e. a gap between the upper case 2 and the lower case 3 combined rotatably with each other) can be prevented from intruding into the sliding area between the thrust bearing surface 422 and the thrust support-target surface 251. As a result, it is possible to prevent degradation of the sliding performance due to intrusion of dust, muddy water or the like at low cost without increasing the number of parts of the slide bearing 1.

Further, in the slide bearing 1 of the present embodiment, the annular lip 43 formed integrally with the outer peripheral edge 423 of the flange 42 of the center plate 4 extends radially outward from the outer peripheral edge 423 of the flange 42, being directed toward the side of the upper surface 421 of the flange 42 from the side of the lower surface 424 of the flange 42. And, the annular lip 43 comes in contact, while being bent, with the annular protrusion 252 formed in the annular groove 24 of the upper case 2, and thereby the annular lip 43 gives reaction force to the contact portion between the lip 43 and the protrusion 252. Accordingly, the slide bearing 1 of the present embodiment can improve the sealing performance between the lip 43 and the protrusion 252. As a result, intrusion of dust, muddy water or the like into the area of sliding between the thrust bearing surface 422 and the thrust support-target surface 251 can be prevented more efficiently.

Further, the slide bearing 1 of the present embodiment has a plurality of discharge holes 35 which are positioned at regular intervals on the outer periphery side of the annular protrusion 34 of the lower case 3 and run through the upper surface 331 and the lower surface 332 of the flange 33. Thereby, the slide bearing 1 of the present embodiment can discharge dust, muddy water or the like which has intruded into the annular space 5 through the labyrinth 6, to the outside from the lower surface 332 of the flange 33. Because of this, it is possible to prevent more efficiently intrusion of dust, muddy water or the like into the area of sliding between the thrust bearing surface 422 and the thrust support-target surface 251.

Further, in the slide bearing 1 of the present embodiment, since the lower surface 332 of the flange 33 of the lower case 3 functions as the upper spring seat 76 that supports the upper end 750 of the coil spring 75 of the strut-type suspension 7, it is not necessary to provide the upper spring seat 76 separately. This reduces the number of parts of the slide bearing 1 and cost.

The present invention is not limited to the above-described embodiment, and can be changed variously within the scope of the invention.

For example, in the above embodiment, the annular lip 43 which is integrally formed with the center plate 4 extends radially outward from the outer peripheral edge 423 of the flange 42, being directed toward the side of the upper surface 421 of the flange 42 from the side of the lower surface 424 of the flange 42. The present invention, however, is not limited to this. It is sufficient that, when the lower case 3 is rotatably combined with the upper case 2 in a state that the center plate 4 is set in the lower case, the lip 43 comes in contact, while being bent, with the annular protrusion 252 formed in the annular groove 24 of the upper case 2, and covers the thrust bearing surface 422 of the center plate 4 and the thrust support-target surface 251 of the upper case 2.

Figure 7:
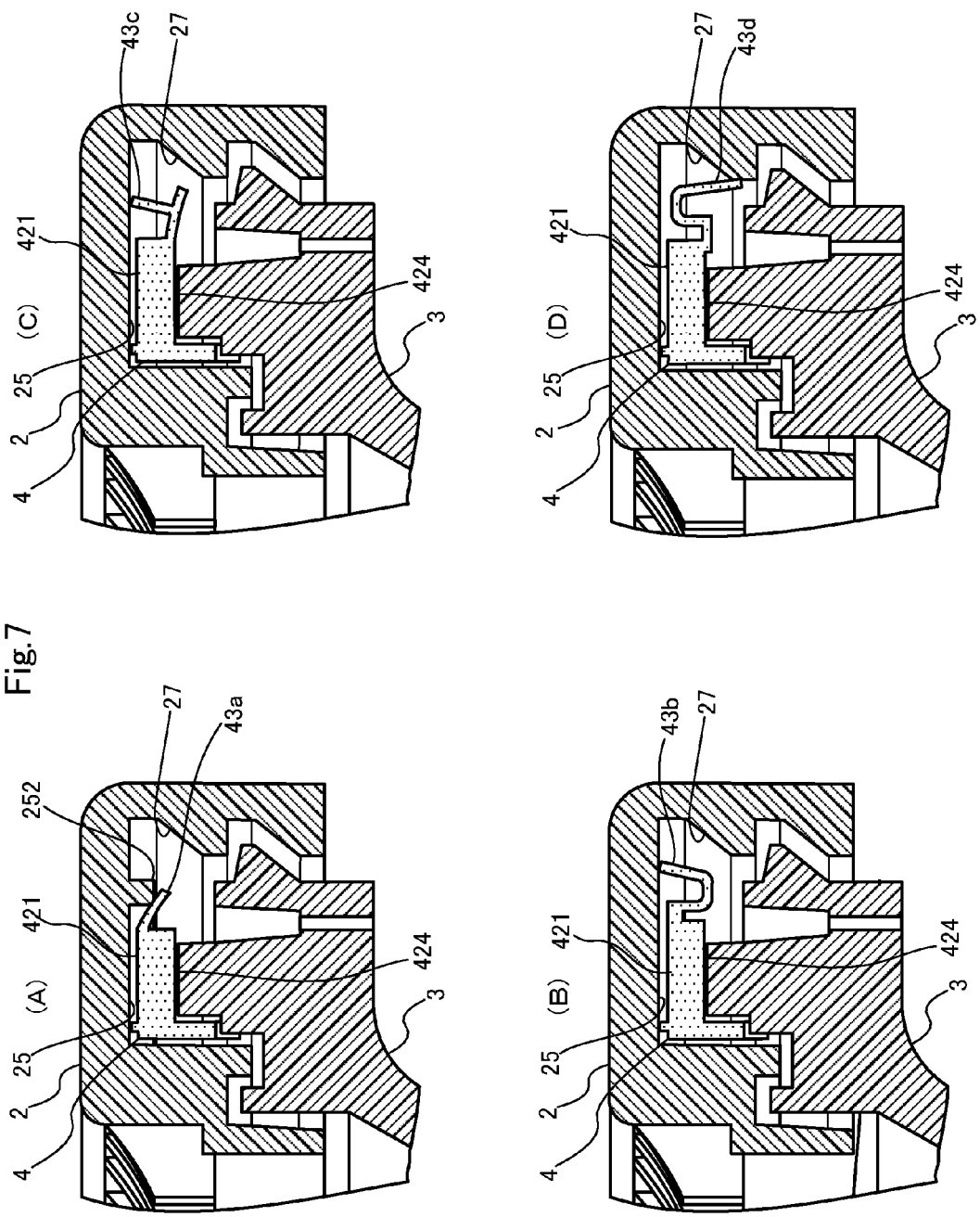
FIGS. 7(A)-7(D) are views for explaining variations 43a-43d of the annular lip 43 integrally formed with the center plate 4, and these views correspond to FIG. 3.

For example, as shown in FIG. 7(A), the lip 43*a* may extend radially outward from the outer peripheral edge 423 of the flange 42, being directed toward the side of the lower surface 424 of the flange 42 from the side of the upper surface 421 of the flange 42.

Further, in the above embodiment, the annular protrusion 252 is formed in the annular groove 24 of the upper case 2, and the annular lip 43 which is integrally formed with the center plate 4 is made to come in contact with this protrusion 252 while being bent. The present invention, however, is not limited to this. The protrusion 252 may be omitted. In this case, the lip 43 is made to come in contact with the groove bottom 25 or the outer-periphery sidewall 27 of the annular groove 24 of the upper case 2, while being bent, and covers the thrust bearing surface 422 and the thrust support-target surface 251.

For example, the lip 43b may have a U shape which is opened on the side of the upper surface 421 of the flange 42 as shown in FIG. 7(B). Or the lip 43c may have an inverted T shape as shown in FIG. 7(C). The lips 43b, 43c come in contact, while being bent, with the groove bottom 25 of the annular groove 24 of the upper case 2, and cover the thrust bearing surface 422 and the thrust support-target surface 251. Further, as shown in FIG. 7(D), the lip 43d may have an inverted U shape which is opened on the side of the lower surface 424 of the flange 42. The lip 43d comes in contact, while being bent, with the outer-periphery sidewall 27 of the annular groove 24 of the upper case 2, and covers the thrust bearing surface 422 and the thrust support-target surface 251.

Figure 8:
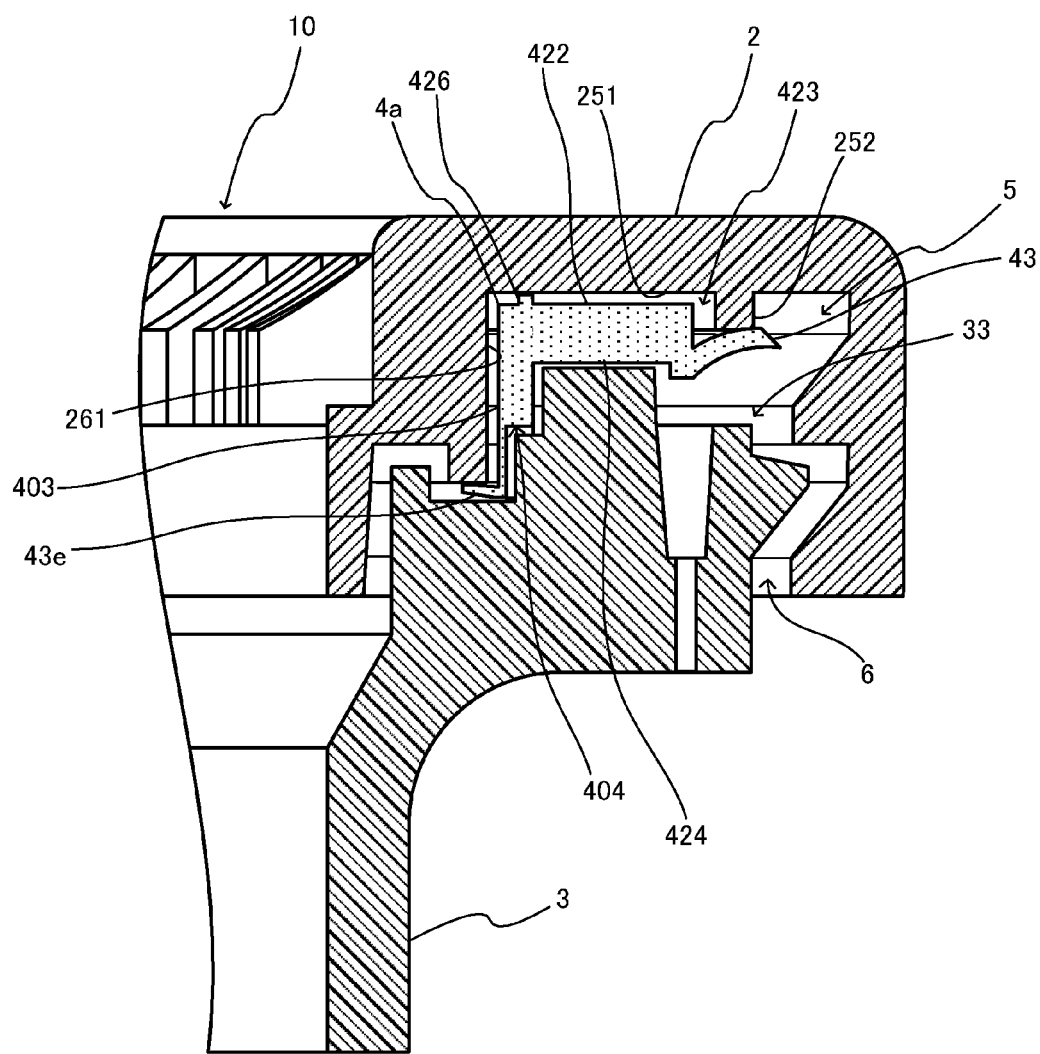
FIG. 8 is a view for explaining a variation 4a of the center plate 4, and this view corresponds to FIG. 3.

Further, in the above embodiment, the annular lip 43 is integrally formed with the outer peripheral edge 423 of the flange 42 of the center plate 4. The present invention, however, is not limited to this. It is sufficient that the lip is formed integrally with at least one of the outer and inner peripheral edges. For example, as shown in FIG. 8, it is possible that the annular lip 43 is integrally formed with the outer peripheral edge 423 (corresponding to the outer peripheral edge of the center plate 4a) of the flange 42 of the center plate 4a, and an annular lip 43e is integrally formed with the lower end surface 404 (corresponding to the inner peripheral edge of the center plate 4a) of the rib 40 of the center plate 4a.

Figure 9:
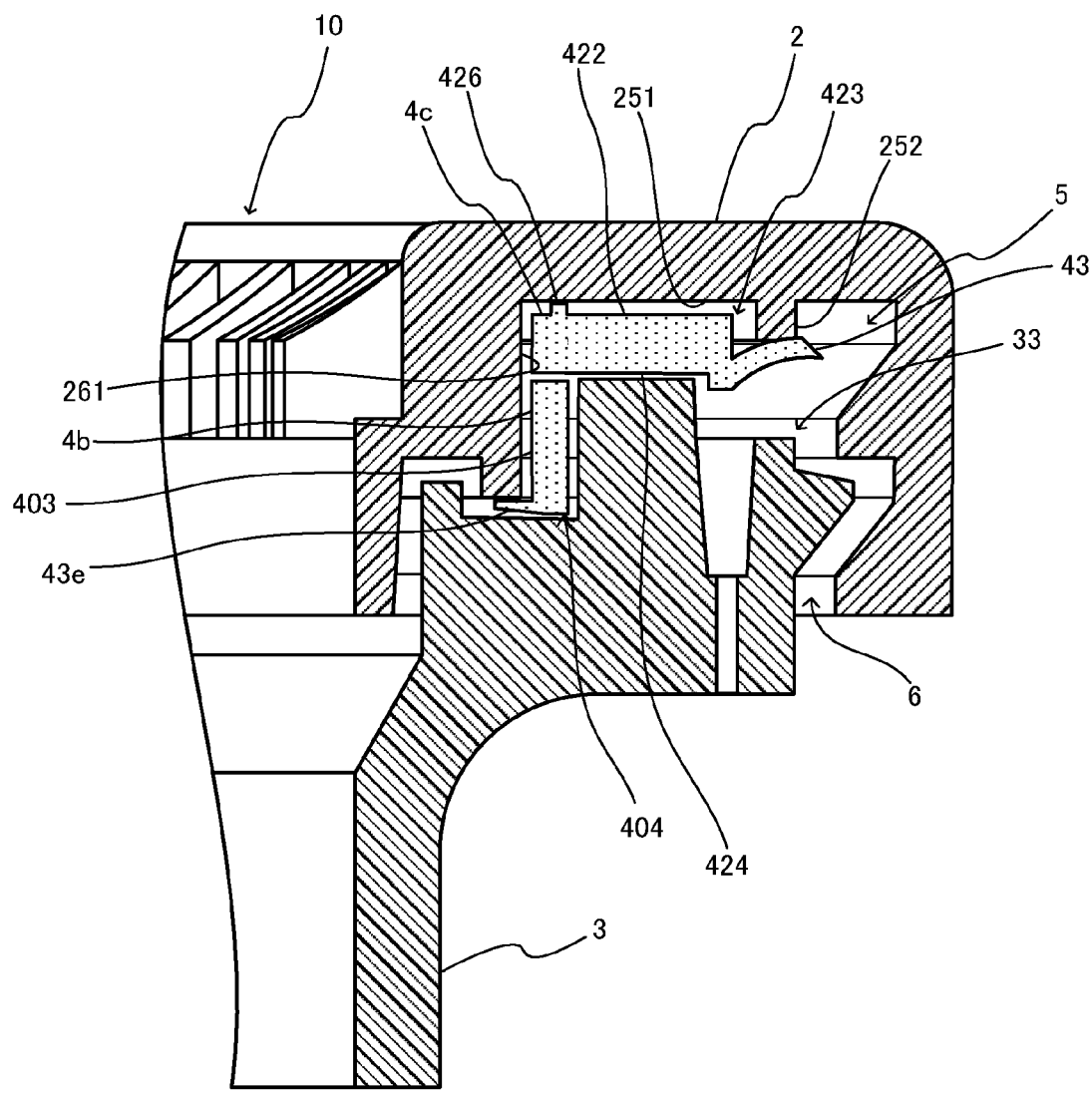
FIG. 9 is a view for explaining variations 4b, 4c of the center plate 4, and this view corresponds to FIG. 3.

Further, the above embodiment uses the center plate 4 comprising the cylindrical lip rib 40 and the annular flange 42, wherein the radial bearing surface 403 is formed in the inner peripheral surface 402 of the rib 40 and the thrust bearing surface 422 is formed in the upper surface 421 of the flange 42. The present invention, however, is not limited to this. For example, as shown in FIG. 9, it is possible to provide a center plate 4b for a radial bearing and to provide a center plate 4c for a thrust bearing, separately. The center plate 4b has a cylindrical rib 40, and a radial bearing surface 403 is formed in the inner peripheral surface 402 of the rib 40. And the center plate 4c has an annular flange 42, and a thrust bearing surface 422 is formed in the upper surface 421 of the flange 42. In FIG. 9, the center plate 4b for the radial bearing may be provided if necessary for supporting the load of the strut-type suspension 7. It is possible to omit the center plater 4b serving as the radial bearing.

Further, in the above embodiment, the center plate 4 is fixed to the lower case 3. However, the center plate 4 may be mounted rotatably on the lower case 3. Namely, similarly to the upper surface 421 of the flange 42 of the center plate 4, a bearing surface may be formed also in the lower surface 424 of the flange 42, and this bearing surface is made to come in slidable contact with the mounting surface 342 of the annular protrusion 34 formed in the upper surface 32 of the lower case body 31 of the lower case 3.

Further, in the above embodiment, the lower surface 332 of the flange 33 of the lower case 3 functions as the upper spring seat 76 that supports the upper end 750 of the coil spring 75 of the strut-type suspension 7. The present invention is not limited to this. An upper spring seat may be provided separately, and the lower case 3 may be fixed to that upper spring seat.

The slide bearing of the present invention can be widely applied, in various mechanisms including a strut-type suspension, to a slide bearing that supports a load applied to a shaft member in the thrust direction while allowing rotation of the shaft member.

REFERENCE SIGNS LIST

1: slide bearing; 2: upper case; 3: lower case; 4, 4a-4c: center plate; 5: annular space; 6: labyrinth; 7: strut-type suspension; 10: receiving hole of the slide bearing 1; 20: insertion hole of the upper case 2; 21: upper case body; 22: upper surface of the upper case body 21; 23: lower surface of the upper case body 21; 24: annular groove of the upper case body 21; 25: groove bottom of the annular groove 24; 26: inner-periphery sidewall of the annular groove 24; 27: outer-periphery sidewall of the annular groove; 30: insertion hole of the lower case; 31: lower case body; 32: upper end of the lower case body 31; 33: flange of the lower case body 31; 34: annular protrusion of the flange 33; 35: discharge hole of the flange 33; 40: rib of the center plate 4; 41: upper end of the rib 40; 42: flange of the center plate 4; 43, 43a-43d: annular lip of the center plate 4; 70: piston rod; 71: hydraulic shock absorber; 72: bump stopper; 73: dust boot; 74: strut assembly; 75: coil spring; 78: upper mount; 221: fitting surface of the upper case 2; 251: thrust support-target surface of the upper case 2; 252: annular protrusion of the upper case 2; 261: radial support-target surface of the upper case 2; 271: concave-convex portion of the upper case 2; 311: outer peripheral surface of the lower case body 31; 331: upper surface of the flange 33; 332: lower surface of the flange 33; 333: outer peripheral surface of the flange 33; 334: concave-convex portion of the flange 33; 341: upper surface of the annular protrusion 34; 342: mounting surface of the lower case 3; 343: inner-periphery sidewall of the annular protrusion 34; 344: rotation lock of the lower case 3; 401: outer peripheral surface of the rib 40; 402: inner peripheral surface of the rib 40; 403: radial bearing surface of the center plate 4; 404: lower end surface of the rib 40; 405: rotation lock of the center plate 4; 406: groove of the radial bearing surface 403; 421: upper surface of the flange 42; 422: thrust bearing surface of the center plate 4; 423: outer peripheral edge of the flange 42; 424: lower surface of the flange 42; 425: inner peripheral edge of the flange 42; 426: annular protrusion of the flange 42; and 427: groove of the thrust bearing surface 422.

The invention claimed is:

1. A slide bearing for supporting a load of a support target, comprising:
   an upper case which is subjected to the load of the support target;
   a lower case which is rotatably combined with the upper case and forms an annular space, in combination with the upper case; and
   a center plate which is placed in the annular space and functions as a bearing body realizing rotation between the upper case and the lower case, wherein:
   the center plate has a lip which is integrally formed with at least one of outer and inner peripheral edges of the center plate; and the lip comes in contact with the upper case or the lower case, in which a support-target surface that slides against a bearing surface formed in the center plate is formed, so as to cover a sliding area between the bearing surface and the support-target surface from an outer or inner periphery side;
   the support-target surface is formed in the upper case;
   the upper case has an annular protrusion formed on an outer periphery side of the support-target surface; and
   the lip is integrally formed with the outer peripheral edge of the center plate and comes in contact, while being bent, with the annular protrusion formed on the outer periphery side of the support-target surface of the upper case.

2. A slide bearing of claim 1, wherein:
   the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

3. A slide bearing for supporting a load of a support target, comprising:
- an upper case which is subjected to the load of the support target;
- a lower case which is rotatably combined with the upper case and forms an annular space, in combination with the upper case; and
- a center plate which is placed in the annular space and functions as a bearing body realizing rotation between the upper case and the lower case, wherein:
- the center plate has a lip which is integrally formed with at least one of outer and inner peripheral edges of the center plate; and the lip comes in contact with the upper case or the lower case, in which a support-target surface that slides against a bearing surface formed in the center plate is formed, so as to cover a sliding area between the bearing surface and the support-target surface from an outer or inner periphery side;
- the support-target surface is formed in the upper case;
- the upper case has an annular groove which has a groove bottom in which the support-target surface is formed, and which forms the annular space when rotatably combined with the lower case; and
- the lip is integrally formed with the outer peripheral edge of the center plate and comes in contact, while being bent, with the groove bottom of the annular groove of the upper case.

4. A slide bearing of claim 3, wherein:
the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

5. A slide bearing for supporting a load of a support target, comprising:
- an upper case which is subjected to the load of the support target;
- a lower case which is rotatably combined with the upper case and forms an annular space, in combination with the upper case; and
- a center plate which is placed in the annular space and functions as a bearing body realizing rotation between the upper case and the lower case, wherein:
- the center plate has a lip which is integrally formed with at least one of outer and inner peripheral edges of the center plate; and the lip comes in contact with the upper case or the lower case, in which a support-target surface that slides against a bearing surface formed in the center plate is formed, so as to cover a sliding area between the bearing surface and the support-target surface from an outer or inner periphery side;
- the support-target surface is formed in the upper case;
- the upper case has an annular groove which has a groove bottom in which the support-target surface is formed, and which forms the annular space when rotatably combined with the lower case; and
- the lip is integrally formed with the outer peripheral edge of the center plate and comes in contact, while being bent, with an outer-periphery sidewall of the annular groove of the upper case.

6. A slide bearing of claim 5, wherein:
the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

7. A slide bearing for supporting a load of a support target, comprising:
- an upper case which is subjected to the load of the support target;
- a lower case which is rotatably combined with the upper case and forms an annular space, in combination with the upper case; and
- a center plate which is placed in the annular space and functions as a bearing body realizing rotation between the upper case and the lower case, wherein:
- the center plate has a lip which is integrally formed with at least one of outer and inner peripheral edges of the center plate; and the lip comes in contact with the upper case or the lower case, in which a support-target surface that slides against a bearing surface formed in the center plate is formed, so as to cover a sliding area between the bearing surface and the support-target surface from an outer or inner periphery side;
- the lower case has discharge holes for discharging muddy water which has intruded into the annular space.

8. A slide bearing of claim 7, wherein:
the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

9. A slide bearing for supporting a load of a support target, comprising:
- an upper case which is subjected to the load of the support target;
- a lower case which is rotatably combined with the upper case and forms an annular space, in combination with the upper case; and
- a center plate which is placed in the annular space and functions as a bearing body realizing rotation between the upper case and the lower case, wherein:
- the center plate has a lip which is integrally formed with at least one of outer and inner peripheral edges of the center plate; and the lip comes in contact with the upper case or the lower case, in which a support-target surface that slides against a bearing surface formed in the center plate is formed, so as to cover a sliding area between the bearing surface and the support-target surface from an outer or inner periphery side;
- the slide bearing supports the load of the support target which is applied to a shaft member, while allowing rotation of the shaft member;
- the upper case is fitted to a mounting mechanism for mounting the shaft member to the support target, in a state that the shaft member is inserted in the upper case;
- the lower case is fitted to a spring seat for an upper end of a coil spring combined with the shaft member, in a state that the shaft member is inserted in the lower case; and
- the center plate is placed in the annular space, in a state that the shaft member is inserted in the center plate.

10. A slide bearing of claim 9, wherein:
the lower case is formed integrally with the spring seat for the upper end of the coil spring.

11. A strut-type suspension used as a suspension of a vehicle comprising:

a strut assembly including a piston rod and a hydraulic shock absorber;

a coil spring into which the piston rod is inserted and which is rotated together with the strut assembly by steering operation; and the slide bearing of claim 10, wherein:

the upper case of the slide bearing is fitted to an upper mount which is the mounting mechanism for mounting the strut assembly to a body of the vehicle, in state that the piston rod is inserted in the upper case; and the spring seat of the lower case of the slide bearing supports the upper end of the coil spring.

12. A strut-type suspension of claim 11, wherein:

the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

13. A slide bearing of claim 10, wherein:

the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

14. A strut-type suspension used as a suspension of a vehicle, comprising:

a strut assembly including a piston rod and a hydraulic shock absorber;

a coil spring into which the piston rod is inserted and which is rotated together with the strut assembly by steering operation; and the slide bearing of claim 9, wherein:

the upper case of the slide bearing is fitted to an upper mount which is the mounting mechanism for mounting the strut assembly to a vehicle body, in a state that the piston rod is inserted in the upper case; and the lower case of the slide bearing is fitted to an upper spring seat which is the spring seat for the upper end of the coil spring.

15. A strut-type suspension of claim 14, wherein:

the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

16. A slide bearing of claim 9, wherein:

the lip is formed to be thinner than the center plate and comes in contact, while being bent, with the upper case or the lower case in which the support-target surface is formed, thereby to give reaction force to a contact portion between the lip and the upper case or the lower case in which the support-target surface is formed.

\* \* \* \* \*